(12) United States Patent
Pruessmeier et al.

(10) Patent No.: US 7,701,738 B2
(45) Date of Patent: Apr. 20, 2010

(54) SUPPLY UNIT FOR A DRIVER CIRCUIT AND METHOD FOR OPERATING SAME

(75) Inventors: Uwe Pruessmeier, Lemgo (DE); Jens Sachs, Petershagen (DE)

(73) Assignee: Elektro Beckhoff GmbH, Verl (DE)

( * ) Notice: Subject to any disclaimer, the term of this patent is extended or adjusted under 35 U.S.C. 154(b) by 531 days.

(21) Appl. No.: 10/567,079

(22) PCT Filed: Mar. 10, 2005

(86) PCT No.: PCT/EP2005/002521

§ 371 (c)(1),
(2), (4) Date: Jul. 26, 2007

(87) PCT Pub. No.: WO2005/093934

PCT Pub. Date: Oct. 6, 2005

(65) Prior Publication Data

US 2007/0273343 A1 Nov. 29, 2007

(30) Foreign Application Priority Data

Mar. 17, 2004 (DE) .................... 10 2004 013 108

(51) Int. Cl.
*H02H 7/122* (2006.01)
*H02M 3/24* (2006.01)
(52) U.S. Cl. .................... 363/132; 363/98; 363/56.02
(58) Field of Classification Search ........ 363/55–56.08, 363/95–98, 132; 323/271, 284, 285
See application file for complete search history.

(56) References Cited

U.S. PATENT DOCUMENTS 4,301,496 A * 11/1981 Schwarz .................... 363/17

(Continued)

FOREIGN PATENT DOCUMENTS

DE 1 638 853 9/1971

(Continued)

OTHER PUBLICATIONS

Summary of "Sichere Antriebssteuerung mit Frequenzumrichtern" [Safe drive control using frequency converters], BIA Report, May 2003, 1 pg.

(Continued)

*Primary Examiner*—Jessica Han
(74) *Attorney, Agent, or Firm*—Faegre & Benson LLP (57) ABSTRACT

A power supply and method of operating the same. The method includes the steps of: operating first and second switches to an "On" position; operating said first switch to a "Off" position, causing a flow of a first free-wheeling current through a first free-wheeling current path; measuring a value of said free-wheeling current; controlling the switching of said second switch responsive to said value of said free-wheeling current; and regulating power from said power supply unit. The power supply includes: an inductive converter; a first free-wheeling current path comprising: a first switch connected in series with said inductive converter and a first means for measuring a first free-wheeling current flowing through said first free-wheeling current path; and a second free-wheeling current path comprising: a second switch connected in series with said inductive converter and a second means for measuring a second free-wheeling current flowing through said second free-wheeling current path.

34 Claims, 3 Drawing Sheets

U.S. PATENT DOCUMENTS

| | | | |
|---|---|---|---|
| 5,202,820 A * | 4/1993 | Miller et al. | 363/56.02 |
| 5,390,070 A * | 2/1995 | Niedermeier | 361/152 |
| 5,771,166 A * | 6/1998 | Lim | 363/132 |
| 6,927,987 B2 * | 8/2005 | Farrington et al. | 363/56.02 |
| 2005/0057868 A1 | 3/2005 | Pullmann et al. | |

FOREIGN PATENT DOCUMENTS

| | | |
|---|---|---|
| DE | 37 37 791 A1 | 4/1989 |
| DE | 37 37 791 C2 | 6/1990 |
| DE | 102 16 226 A1 | 10/2003 |
| EP | 1 493 064 B1 | 1/2005 |
| WO | WO 03/085313 A2 | 10/2003 |

OTHER PUBLICATIONS

Zinken, Erwin; "Vermeidung von unerwartetem Anlauf bei stromrichtergespeisten Antrieben" [Avoiding unexpected starting in inverter-powered drives]; Antriebstechnik 33, 1994, No. 10, pp. 50-53 *English translation to follow in Supplemental IDS .

* cited by examiner

SUPPLY UNIT FOR A DRIVER CIRCUIT AND METHOD FOR OPERATING SAME

CROSS REFERENCE TO RELATED APPLICATIONS

This application is the national phase under 35 U.S.C. §371 of PCT International Application No. PCT/EP2005/002521, which has an international filing date of Mar. 10, 2005, and which claims priority to German patent application number GE102004013708.2 filed Mar. 17, 2004.

FIELD OF INVENTION

This invention provides a method for operating a power stage in a power electronics circuit for an electric motor. The invention also provides a supply unit for a driver circuit for an electric motor.

BACKGROUND OF THE INVENTION

Electrical driver units generally comprise an electric motor and a power electronics circuit. The power electronics circuit draws power from a supply system at a fixed frequency and voltage and converts this power to produce a rotating field in a motor. The speed and torque of the motor are regulated by the power electronics circuit. The power electronics circuit generally comprises a servo amplifier or, in an unregulated drive system, a frequency converter. The servo amplifier and the frequency converter are normally together called an inverter and are actuated by means of the driver circuit provided in the power electronics circuit.

When electric drive units are being used, it is necessary for them to be immediately turned off and safely stopped in the event of faults or risks. That is to say that the motor must under no circumstances move on account of electrical actuation.

Normally, this is done by turning off the power supply for the power electronics circuit, as is known, by way of example, from the document BIA Report May 2003 "Sichere Antriebssteuerung mit Frequenzumrichtern" [Safe drive control using frequency converters], ISBN 3-88383-645-1 or from the document Antriebstechnik 33 (1994), No. 10, "Vermeidung von unerwartetem Anlauf bei stromrichtergespeisten Antrieben" [Avoiding unexpected starting in inverter-powered drives], Erwin Zinken, BIA St Augustin. This allows the motor to be reliably stopped, since no further power is supplied to the motor. However, when it is started again the entire power electronics circuit needs to be turned on again, which takes a considerable amount of time.

A further option is to isolate the motor from the power electronics circuit using an electromechanical switch, e.g. a contactor. However, the sudden switching can easily damage the power electronics circuit on account of overvoltages. In addition, the loading is also very high for the contactor, since high current levels need to be switched.

A further solution for safely turning off the rotating field is to suppress the ignition pulse. Ignition pulses are equivalent to control signals generated by the driver circuit in the power electronics circuit, which actuates the power stage in the power electronics circuit. The power stage has six electronic switches which are controlled by means of control signals, so that the internal DC voltage is converted into a three-phase alternating current. The ignition pulse can be suppressed in various ways. It is usual—as known from the aforementioned document BIA Report May 2003—to interrupt the supply voltage at the driver circuit. The voltage is usually turned off by a relay in the event of a fault. Safe stopping through ignition pulse suppression, i.e. by not producing the control signals, leaves all the other components in the power electronics circuits in a full standby state. For the ongoing application, it is thus possible to put the electrical drive system into the safe state and to activate it again without this being noticed. Delays when the driver circuit is turned on again do not arise in essence.

The switching of the supply voltage at the driver circuit has to date been effected by a mechanical relay, which is subject to wear. Such a mechanical switching relay does not allow the power electronics circuit to be designed for "single-fault safety". "Single-fault safety" means that if a fault occurs in one of the safety-related components used the actuation of the motor is stopped immediately.

SUMMARY OF THE INVENTION

It is therefore an object of the present invention to provide a method for operating a power stage in a power electronics circuit for an electric motor which is designed for "single-fault safety" in particular. It is also an object of the present invention to provide a supply unit for a driver circuit, particularly for actuating a motor, which is designed for "single-fault safety".

A first aspect of the present invention provides a method for operating a supply unit for a driver circuit, particularly in a power electronics circuit for an electric motor. A control current is switched by an inductive converter using a first and a second switch on the basis of a first control signal and a second control signal in order to generate a power supply for the driver circuit. Turning off the first and second switches allows a free-wheeling current to flow through a first or a second free-wheeling current path. Actuating the power stage involves first of all turning on the first and second switches on the basis of the first and second control signals and then, e.g. on the basis of an actuation value, turning off the first switch in a turnoff operation using the first control signal. The turnoff operation prompts measurement of the free-wheeling current through the first free-wheeling current path. The second switch is then switched, or not, using the second control signal on the basis of the measured first freewheeling current.

The inventive method has the advantage that in a supply unit a switching operation taking place in a normal mode involves the operation of the first switch being checked by using the measured free-wheeling current to identify whether the first switch has actually interrupted the current path on the basis of the first control signal and is thus operating correctly. Since generating the power supply requires both switches to be turned on and off constantly, essentially at the same time, the generation of the power supply can be interrupted immediately by preventing one of the switches from switching.

In line with a first alternative, the second switch is prevented from being turned off if measurement of the free-wheeling current through the first free-wheeling path detects a fault. Since, when a fault is identified in this manner, the turn-off operation for the first switch has not actually turned said switch off, the circuit thus remains closed via the inductive converter. As a result of the switching of the second switch being prevented, however, no further switching operation takes place, which means that no power can be transmitted by the inductive converter.

In line with a further alternative, the first and second switches can be prevented from being turned on again if measurement of the free-wheeling current through the first free-wheeling current path detects a fault. In this case, the second switch is turned off after the fault is identified. This has the advantage over the first alternative that a continuous direct current cannot flow through the inductive converter, which current can sometimes result in destruction thereof.

Provision can be made for a further switching operation to involve first of all turning on the first and second switches again on the basis of the first and second control signals and then turning off the second switch in a further turn-off operation using the second control signal. As a result, the free-wheeling current through the second free-wheeling current path is measured and the first switch is switched using the first control signal on the basis of the measured free-wheeling current through the second free-wheeling current path. This also allows the operation of the second switch to be checked.

In particular, one of the two switches can be checked alternately in each switching cycle to determine whether it is operating correctly, i.e. to determine whether it is being turned off correctly. If one of the two switches does not interrupt the respective current path correctly, the subsequent check on the switching behavior prevents further switching of the respective other switch, which means that no further voltage or current change takes place on the inductive converter in order to stop further power transmission and hence the power supply immediately. Actuation of the power stage in the power electronics circuit is stopped such that no power is provided for generating a rotating field for a downstream electric motor which needs to be stopped.

If measurement of the free-wheeling current through the second free-wheeling current path detects a fault, the first and second switches can firstly be prevented from being turned on again and/or the first switch can be prevented from being turned off, in a similar manner to the procedure when checking the first free-wheeling current path.

Provision may be made for the first and/or the second control signal to be generated using a periodic signal. The periodic signal can be blocked for generating the first and/or the second control signal if measurement of the free-wheeling current through the first and/or the second free-wheeling current path detects a fault. Blocking the periodic signal required for generating the control signals is one way of immediately stopping the switching operations for the first and second switches.

A further aspect of the present invention provides a supply unit for a driver circuit for a power stage, particularly in a power electronics circuit for an electric motor. The driver circuit has an inductive converter which is connected in series with a first and a second switch in order to provide a power supply by switching the switches. The first and second switches can be actuated by a first and a second signal, respectively. The power supply can be produced in the inductive converter by turning on and off the first and second switches. The first switch has a first free-wheeling current path connected to it in order to accept a freewheeling current in a turn-off operation for the first switch. The second switch is connected to a second freewheeling current path in order to accept a free-wheeling current in a turn-off operation for the second switch. The driver circuit has a control device in order, in a turn-on operation, to turn on the first and second switches on the basis of the first and second control signals and in order, in a turn-off operation, first of all to turn off the first switch and to measure a freewheeling current through the first free-wheeling current path, and in order to switch the second switch on the basis of the measured free-wheeling current path.

The supply unit based on the invention is used for operating a driver circuit for a power stage with a power supply which is produced by turning on and off a supply voltage on an inductive converter. The turning-on and turning-off are effected using two switches which need to be switched essentially at the same time. The control device first of all turns on the two switches at the same time and then, e.g. on the basis of an actuation value, turns off the first switch. If the first switch is faulty and does not interrupt the current path through the inductive converter, this is detected by the measurement of the free-wheeling current through the first freewheeling current path, and the second switch is prevented from being switched again. If it is detected that the first circuit is switched correctly, the second switch is likewise turned off, so that the period of time between turning off the first switch and turning off the second switch is as short as possible.

The first free-wheeling current path can have a first current sensor and/or a first free-wheeling diode. The second free-wheeling current path can have a second current sensor and/or a second free-wheeling diode.

The control device can be designed so that, in a further turn-off operation, it first of all turns off the second switch and measures a free-wheeling current through the second free-wheeling current path in order to switch the first switch on the basis of the measured free-wheeling current. The effect which can be achieved by this is that first the first and then the second switch are alternately turned off in each turn-on/turn-off operation so as to check the operation of the first and second switches in succession.

In line with a further embodiment, the supply unit comprises a first control circuit and a second control circuit, which is separate from the latter, with the first control circuit controlling the switching of the first switch and measuring the current through the first free-wheeling current path. The second control circuit accordingly controls the switching of the second switch and measures the current through the second free-wheeling current path. The first control circuit and the second control circuit are coupled to one another such that the first control circuit generates the first control signal on the basis of a second Active signal on line 25 which is applied by the second control circuit, and the second control circuit conversely generates the second control signal on the basis of a first Active signal on line 24 which is applied by the first control circuit.

This makes it possible to achieve single-fault safety, which interrupts the generation of control signals and hence the provision of the power supply as soon as a fault occurs in one of the switches, in one of the freewheeling paths or in one of the control circuits. As soon as the control circuit identifies the fault in the respective associated switch, it checks the operability of the switch. By virtue of the control circuit generating the Active signal which is required by the respective other control circuit in order to actuate the associated switch, provision of the power supply is interrupted even if one of the control circuits fails. This means that the driver circuit based on the invention has "single-fault safety", since provision of the power supply is interrupted immediately when a fault occurs in one of the components.

So that the first and second Active signals on lines 24, 25 cannot be generated incorrectly, said signals are provided as a periodic signal or as a signal sequence from the respective control circuit, so that in the event of a fault the Active signals on lines 24, 25 continue to be produced. The periodic signal or the signal sequence has the advantage that in the event of a fault in the respective control circuit which would result in a permanent state of the corresponding Active signal this state does not result in the respective control signal continuing to be generated in the duplicate other control circuit.

Preferably, the inductive converter is in the form of a transformer.

In line with one embodiment of the invention, the control device is designed to generate the first and/or the second control signal using a provided clock signal. If a fault occurs, the clock signal can be interrupted, which means that generation of the first and second control signals is interrupted.

BRIEF DESCRIPTION OF THE DRAWINGS

Preferred embodiments of the invention are explained in more detail below with reference to the appended drawings, in which.

DETAILED DESCRIPTION OF THE INVENTION

Figure 1:
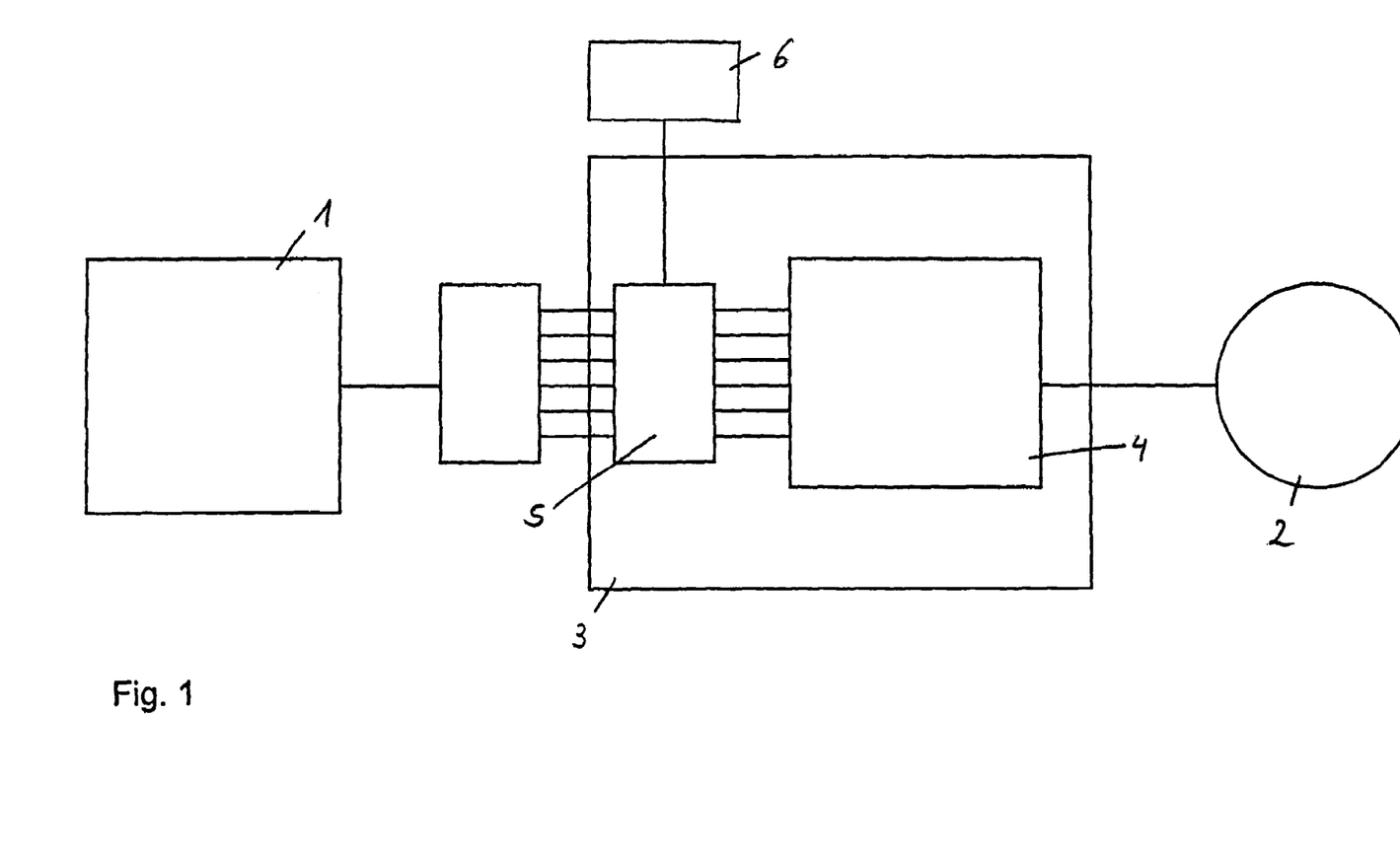
FIG. 1 shows a block diagram to illustrate a drive system.

FIG. 1 shows a block diagram of the actuation of an electric motor in a drive system. A control system 1 generates actuation values, with an electric motor 2 being intended to be actuated on the basis of the actuation values. The electric motor 2 is usually actuated using a power electronics circuit 3 which comprises a power stage 4 and a driver circuit 5. In the example shown, the power stage 4 generates three phase currents and for this purpose typically has 6 electronic switches (not shown) which are actuated by means of respective switching signals from driver circuit 5. The electric motor 2 is preferably in the form of a synchronous or asynchronous motor, particularly in the form of an electric motor which can be operated using an electrical rotating field and has no separate commutation.

The power stage 4 is used to provide the rotating field at the necessary current level for operating the electric motor 2. The switching signals which are used to actuate the power stage 4 are provided by the driver circuit 5.

In some fields of application, it is necessary for the electric motor 3 to be stopped immediately when a fault occurs so that the electric motor 2 does not continue to run uncontrolled. This is done by virtue of the driver circuit 5 in the power electronics circuit 3 immediately interrupting the generation of the respective switching signal as soon as a fault has been identified. To generate the rotating field for the electric motor 2, a particular sequence of switching signals is required. If the driver circuit stops these switching signals, it is not possible to produce the rotating field. This allows the electric motor 2 to be stopped.

Generation of the switching signals in the driver circuit 5 is interrupted, in particular, by interrupting the power supply to the driver circuit 5. The power supply is provided by a supply unit 6 which is connected to the driver circuit 5.

Figure 2:
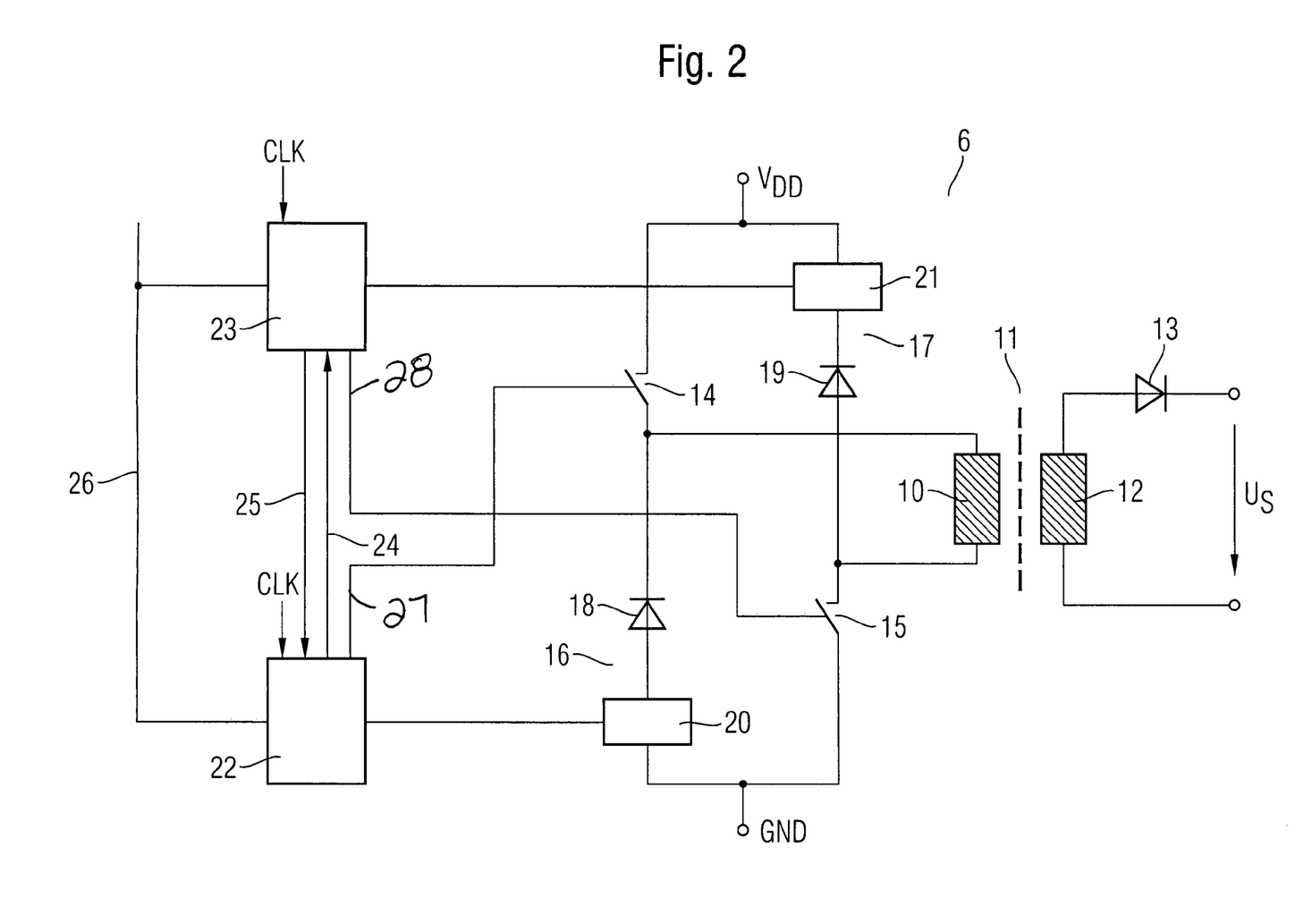
FIG. 2 shows a block diagram of the inventive driver circuit.

FIG. 2 shows a circuit diagram of an inventive supply unit 6 for a driver circuit 5. The power supply in the form of a supply voltage is provided for the driver circuit 5, which generates switching signals which are forwarded to the electronic switches in the power stage 4.

The switching signals are DC isolated and are in a voltage range which is appropriate for an electronic switch in a downstream power stage. Typically, the gate input of a power field effect transistor is inbuilt in the power stage. The switching signal is essentially a pulse-width-modulated signal which transmits on and off states to the power stage.

The power stage (not shown) then turns on or off a coil winding in the electric motor on the basis of the switching signal.

The supply unit 6 which is shown in FIG. 2 generates a supply voltage as a power supply, said supply voltage being produced in a secondary coil 12 on the basis of a signal being switched on a primary coil 10 in a transformer 11. Since turning on and off the flow of current through the primary coil produces positive and negative voltages in the secondary coil 12, this resultant voltage signal is rectified by means of a rectifier diode 13 and is preferably smoothed by a capacitor (not shown), so that essentially a positive voltage is applied to the driver circuit 5.

The primary coil 10 is connected in series with a first switch 14 and a second switch 15 between a high supply voltage potential VDD and a low supply voltage potential, preferably a ground potential GND. The first and/or the second switch 14, 15 are preferably in the form of field effect transistors, these each being able to be actuated by means of a control signal via an appropriate gate connection. To switch the transformer 11, the first and second switches 14, 15 are usually turned on and off at the same time, so that the switching operations in the primary coil 10 induce the corresponding voltage signal in the secondary coil 12 of the transformer 11.

Particularly in the turn-off operation, the inductance of the primary coil 10 produces a free-wheeling current which is in the opposite direction to the flow of current when the primary coil 10 is in the turned-on state. So that this current does not result in harmful overvoltages on the field effect transistors and other components of the driver circuit, each of the switches 14, 15 is provided with a free-wheeling current path 16, 17.

The first switch 14 is arranged between the high supply potential VDD and a first connection of the primary coil 10. The first connection of the primary coil 10 is connected via the first free-wheeling current path 16 to the ground potential, so that a free-wheeling current when the first switch is turned off can drain to the ground potential GND. The second switch 15 is arranged between a second connection of the primary coil 10 and the ground potential GND. The second connection of the primary coil 10 is likewise connected via a second freewheeling current path 17 to the high supply voltage potential VDD.

So that turning on the switches does not produce a short between the high supply potential VDD and the ground potential GND, the first free-wheeling current path 16 contains a first free-wheeling diode 18 and the second free-wheeling current path 17 contains a second freewheeling diode 19 such that a voltage which is negative with respect to the ground potential and which is applied to the first connection of the primary coil 10 is drained via the first free-wheeling current path 16, and a voltage which is higher than the high supply potential VDD and which is applied to the second connection of the primary coil 10 is drained via the second free-wheeling current path 17, since the respective free-wheeling diode 18, 19 becomes conductive in this direction.

The first free-wheeling current path 16 has a first current sensor 20, and the second free-wheeling current path 17 has a second current sensor 21, in order to measure the respective free-wheeling currents through the free-wheeling current paths 16, 17. The current sensors 20, 21 may be designed, by way of example, using a measuring resistor, e.g. a shunt, or may have a magnetic field current sensor in which the resistor in the respective free-wheeling current path is not affected by a measuring resistor. To measure a free-wheeling current, it is also possible to detect the free-wheeling current by measuring the current through the corresponding switch.

A first control circuit 22 and a second control circuit 23 are provided for generating the first and second control signals on lines 27, 28 for the switches 14, 15. The first control circuit 22 is connected to the first current sensor 20, so that a measured free-wheeling current in the first free-wheeling current path 16 is provided in the first control circuit 22. The first control circuit 22 is connected to a control input of the first switch 14, particularly to the gate connection of the first field effect transistor. The second control circuit 23 is connected to the second current sensor 21, so that the measured free-wheeling current in the second free-wheeling current path 17 is available in the second control circuit 23. The second control circuit 23 is connected to a control input of the second switch 15, i.e. to the gate connection of the second field effect transistor.

The first control circuit 22 is connected to the second control circuit 23 via a first Active signal line 24 in order to transmit a first Active signal to the second control circuit 23. A second Active signal line 25 is provided, so that the second control circuit 23 can transmit a second Active signal to the first control circuit 22. The control circuits 22, 23 receive, via a signal line 26, an externally prescribed enable signal which permits or prevents actuation of the electric motor 2. In addition, each of the control circuits 22, 23 has an input for a clock signal CLK. The control circuits are synchronized to this clock.

The text below describes the mode of operation of the first control circuit 22 with regard to the first switch 14 and the first free-wheeling current path 16, the second control circuit 23 operating in essentially similar fashion with regard to the second switch 15 and the second free-wheeling current path 17.

The first and second control circuits 22, 23 receive the enable value via the data line 26 and, at the start of the period duration, generate a respective turn-on signal as a first control signal on line 27 or as a second control signal on line 28, which is supplied to the first switch 14 or the second switch 15, respectively, e.g. a high level. The respective turn-on signal turns on the switches 14 and 15, so that the high supply potential VDD is connected to the first connection of the primary coil 10 and the low supply potential GND is connected to the second connection of the primary coil 10. When a turned-on period has elapsed, the first control signal on line 27 is switched such that the first switch 14 is turned off, e.g. by changing to a low level. The turnoff operation produces a free-wheeling voltage on the primary coil 10 of the transformer 11, said voltage being reduced via the first free-wheeling current path 16.

The free-wheeling current in the first free-wheeling current path 16 is measured using the first current sensor 20, and the measured value is made available to the first control circuit 22. The latter compares the measured current value with a threshold current value which is chosen such that it is possible to detect that a significant free-wheeling current is flowing. This allows the switching behavior of the first switch 14 to be checked. This is because if the first switch 14 is not interrupted on the basis of the first control signal on line 27, the first current path 16 through the primary coil 10 is not interrupted and a free-wheeling voltage which would need to be reduced via the first free-wheeling current path 16 does not arise. This is detected as a fault in the first control circuit 22, and further generation of the first control signal on line 27 to turn on the first switch 14 is stopped.

If a free-wheeling current in the first free-wheeling current path 16 is measured which exceeds the threshold current value, the first control circuit 22 generates a first Active signal on line 24, as a result of which the first Active signal is transmitted to the second control circuit 23. When the first Active signal is received, the second control circuit 23 immediately turns off the second switch 15, so that for the entire period duration of the second control signal on line 28 only a short time delay arises between turning off the first switch 14 and turning off the second switch 15, and this time delay has no significant effects on the generation of the switching signal.

The first and second control circuits 22, 23 operate essentially in sync, which means that it is advantageous if the same clock signal CLK is applied to both control circuits 22, 23. The two control circuits 22, 23 are tuned to one another such that during a clock cycle only one of the two control circuits ever generates the control signal for turning off the respective switch 14, 15 independently without receiving the Active signal beforehand. Preferably, the two control circuits 22, 23 operate out of sync with regard to the turn-off signal, and particularly in a first clock cycle the first control circuit 22 generates the first control signal on line 27 for turning off the first switch 14 independently and the second control circuit 23 makes the second control signal on line 28 for turning off the second switch 15 dependent on the first switch 14 having been turned off. In a second clock cycle, the second control circuit 23 then generates the control signal on line 28 for turning off the second switch 15 independently of the first Active signal on line 24, and the first control circuit 22 on the basis of the second Active signal on line 25 generated by the second control circuit 23 when the second switch 15 is successfully turned off.

The respective Active signal indicates to the respective control circuit 22, 23 that the control signal for turning off the respective switch 14, 15 now needs to be generated. That the respective switch has been turned off is preferably indicated by a suitable edge of the Active signal, since this edge needs to be generated actively by the respective control circuit. It is also possible for faults which occur in one of the control circuits to result in immediate interruption of the generation of the switching signal, since the Active signal can be produced only by a correctly operating control circuit 22, 23. This provides the presented supply unit 6 with "single-fault safety", i.e. when a fault occurs in one of the components used the generation of the switching signal is immediately interrupted, so that the rotating field is no longer produced to actuate the electric motor 2.

The proposed supply unit is thus in a form such that faults when one of the switches 14, 15 is turned off immediately result in an appropriate switching signal no longer being generated. Since the relevant control circuit 22, 23 may also have faults and then might no longer identify a relevant fault when the respective switch is switched, the control circuit must actively generate an Active signal when the switch connected to it is detected to have been turned off. This signal would not be generated in a faulty control circuit, which means that the respective other control circuit does not generate a turn-off signal. In the subsequent clock cycle too, no control signals would be generated which result in one of the switches 14, 15 being switched. Hence, by way of example, a fault in the first switch 14 which involves the first switch 14 no longer switching from its turned-on state to its turned-off state results in the second switch 15 no longer being turned off either, since the Active signal required by the second control device 23 would no longer be generated by the first control circuit 22. The current path through the primary coil 10 is thus maintained. Since there is no longer a change of current in the primary coil 10, no power is transmitted to the secondary coil 12 either, which means that the supply voltage is turned off.

Alternatively, provision may also be made for the occurrence of a fault which is identified by one of the control circuits and is indicated to the others by the absence of the correct Active signal to result in the control circuit generating a control signal to turn off the switch which is connected to it, in order to interrupt the current path through the primary coil 10 in every case, since otherwise a very high direct current would flow through the primary coil 10 which might destroy it. However, this results in a further switching operation in which power briefly continues to be transmitted to the secondary coil 12 and thus produces a further edge in the switching signal, so that the turnoff operation for the rotating field for actuating the electric motor 2 would continue to be produced. Depending on the application in which the electric motor 2 is being operated, this is a negligibly short period in the range of a few μsec, however.

Similarly, faults in one of the free-wheeling diodes 18, 19 can be identified. If one of the free-wheeling diodes 18, 19 starts to conduct in the reverse direction, there is a short between the high supply potential VDD and the ground potential GND, and the safe state is reached. The circuit would then not operate. If the diode in question starts not to conduct in the forward direction, however, this failure does not prevent operation but is relevant to safety if a transistor with a short fails. The fault that the respective free-wheeling diode 18, 19 starts not to conduct in the forward direction results in the current sensor 20, 21 measuring no free-wheeling current, which means that the respective control circuit does not generate an Active signal, since it cannot detect that the respective switch 14, 15 has turned off. Hence, a faulty diode results either in a short being produced in the circuit which stops the electric motor or in the generation of the control signal in question being prevented. A significant advantage of such a supply unit is that diagnostic intervals are just one cycle of the clock signal CLK, which means that they can be carried out at short intervals of time of 50 μsec, for example.

In addition, a superordinate control system (not shown) may be connected to the control units 22 and 23. If one were no longer to operate correctly, the superordinate control system can block the enable signal on signal line 26, so that the control circuits 22, 23 generate no more control signals.

Figure 3:
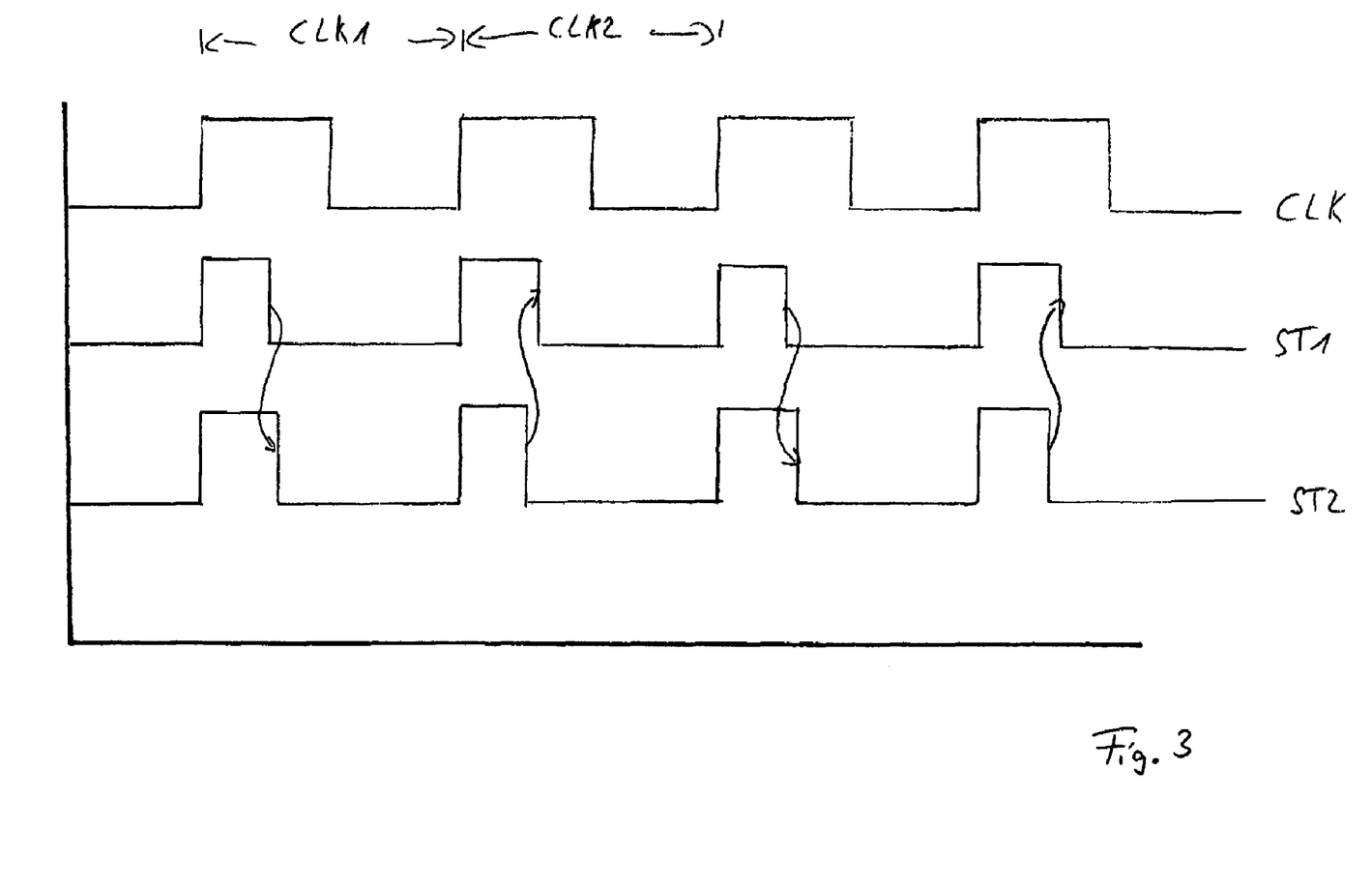
FIG. 3 shows a signal flowchart to illustrate the actuation of the switches in the driver circuit.

FIG. 3 shows a signal diagram to illustrate the profiles of the clock signal CLK and the first and second control signals ST1, ST2. It can be seen that the first and second control circuits 22, 23 indicate that the respective switch has been turned on upon the rising edge of the clock signal by means of a likewise rising edge of the control signals ST1, ST2. For a particular period, the two control signals ST1, ST2 remain at the high levels. It can be seen that the first control signal ST1 turns off the first switch 14 with a rising edge. A suitable Active signal is then generated in the control circuit 22 if the switching operation was successful and no other fault has occurred. This signal is transmitted to the second control circuit 23, which generates the falling edge for the second control signal ST2 in order to turn off the second switch 15. Up to the next rising edge of the clock signal CLK, the control signals remain at a low level. Upon the next rising edge of the clock signal CLK, the two control signals ST1, ST2 change to a high level, with the second control circuit 23 now generating a falling edge of the second control signal ST2. The falling edge of the second control signal ST2 turns off the second switch 15, with an Active signal being generated if the second switch 15 has been turned off and no further fault has occurred. The Active signal then likewise turns off the first switch 14, with a negligible time delay, in line with a falling edge of the first control signal ST1. It is thus possible for the operation of the switches 14, 15 or of the components in the respective free-wheeling current path to be checked alternately, with generation of the control signals ST1, ST2 being stopped immediately if a fault is identified.

We claim:

1. A method of operating a power supply unit, the method comprising the steps of:
   operating a first and a second switch to an "On" position;
   operating said first switch to a "Off" position and causing a flow of a first free-wheeling current through a first free-wheeling current path;
   measuring a value of said first free-wheeling current;
   controlling the switching of said second switch responsive to said value of said first free-wheeling current; and
   regulating power from said power supply unit.

2. The method of claim 1, further comprising the steps of:
   operating said first and said second switch to the "On" position;
   operating said second switch to a "Off" position and causing the flow of a second free-wheeling current through a second free-wheeling current path;
   measuring a value of said second free-wheeling current; and
   controlling the switching of said first switch responsive to said value of said second free-wheeling current.

3. The method of claim 2, further comprising the steps of:
   designating said first free-wheeling current as faulty when the value of said first free-wheeling current is less than a first prescribed threshold value; and
   designating said second free-wheeling current as faulty when the value of said second free-wheeling current is less than a second prescribed threshold value.

4. The method of claim 3, comprising the step of maintaining said second switch in the "On" position when said first free-wheeling current is faulty.

5. The method of claim 3, comprising the step of maintaining said first and said second switch in the "Off" position when said first free-wheeling current is faulty.

6. The method of claim 3, comprising the step of maintaining said first switch in the "On" position when said second free-wheeling current is faulty.

7. The method of claim 3, comprising the step of maintaining said first and said second switch in the "Off" position when said second free-wheeling current is faulty.

8. The method of claim 1, further comprising the steps of:
   generating a first control signal for operating said second switch; and
   generating a second control signal for operating said first switch.

9. The method of claim 8, comprising the steps of:
   generating said first control signal from a first periodic signal; and
   generating said second control signal from a second periodic signal.

10. The method of claim 8, comprising the steps of:
    generating said first control signal from a first clock signal; and
    generating said second control signal from a second clock signal.

11. The method of claim 8, comprising the step of synchronizing said first and said second control signals to a clock signal.

12. The method of claim 8, further comprising the steps of:
    generating said first control signal when said first free-wheeling current is not faulty; and generating said second control signal when said second free-wheeling current is not faulty.

13. The method of claim 1 operating a power electronics circuit.

14. The method of claim 13 providing power to said power electronics circuit.

15. The method of claim 1 operating an electric motor.

16. The method of claim 1 providing power to an inductive converter, said method further comprising the steps of:
   operating said first switch between said "On" and said "Off" positions; and
   operating said second switch between said "On" and said "Off" positions.

17. A power supply unit comprising:
   an inductive converter;
   a first free-wheeling current path comprising:
      a first switch connected in series with said inductive converter, said first switch operable between an "On" position and a "Off" position; and
      a first means for measuring a first free-wheeling current flowing through said first free-wheeling current path; and
   a second free-wheeling current path comprising:
      a second switch connected in series with said inductive converter, said second switch operable between an "On" position and a "Off" position; and
      a second means for measuring a second free-wheeling current flowing through said second free-wheeling current path.

18. The power supply unit of claim 17, wherein:
   said first means for measuring said first free-wheeling current includes a first current sensor; and
   said second means for measuring said second free-wheeling current includes a second current sensor.

19. The power supply unit of claim 17, further comprising:
   a first control circuit measuring said first free-wheeling current and operating said first switch between said "On" and "Off" positions; and
   a second control circuit measuring said second free-wheeling current and operating said second switch between said "On" and "Off" positions.

20. The power supply unit of claim 19, wherein
   said second control circuit receives a first signal from said first control circuit; and
   said first control circuit receives a second signal from said second control circuit.

21. The power supply unit of claim 20, wherein said first signal is a first periodic or clock signal generated by said first control circuit and wherein said second signal is a second periodic or clock signal generated by said second control circuit.

22. The power supply unit of claim 20, wherein said first signal is generated by said first control circuit from a first periodic signal or a clock signal and wherein said second signal is generated by said second control circuit from a second periodic signal or a clock signal.

23. The power supply unit of claim 17, configured to operate a power electronics circuit.

24. The power supply unit of claim 23, configured to provide power to said power electronics circuit.

25. The power supply unit of claim 17, configured to operate an electric motor.

26. The power supply unit of claim 17, wherein said inductive converter provides power in response to operating said first switch and said second switch between said "On" and "Off" positions.

27. The power supply unit of claim 17, configured to generate
   said first free-wheeling current in response to operating said first switch to said "Off" position; and
   said second free-wheeling current in response to operating said second switch to said "Off" position.

28. The power supply unit of claim 17, wherein said inductive converter is a transformer.

29. The power supply unit of claim 17, wherein said first switch does not operate when said first free-wheeling current is less than a first prescribed value.

30. The power supply unit of claim 17, wherein said second switch does not operate when said second free-wheeling current is less than a second prescribed value.

31. The power supply unit of claim 17, wherein said first free-wheeling current path further comprises a first free-wheeling diode.

32. The power supply unit of claim 17, wherein said second free-wheeling current path further comprises a second free-wheeling diode.

33. The power supply unit of claim 17, wherein said first switch is a first field effect transistor.

34. The power supply unit of claim 17, wherein said second switch is a second field effect transistor.

* * * * *